F. KLENK.
INSULATOR FOR HIGH VOLTAGE ELECTRIC CABLE SPLICES.
APPLICATION FILED FEB. 6, 1914.
1,146,717.
Patented July 13, 1915.
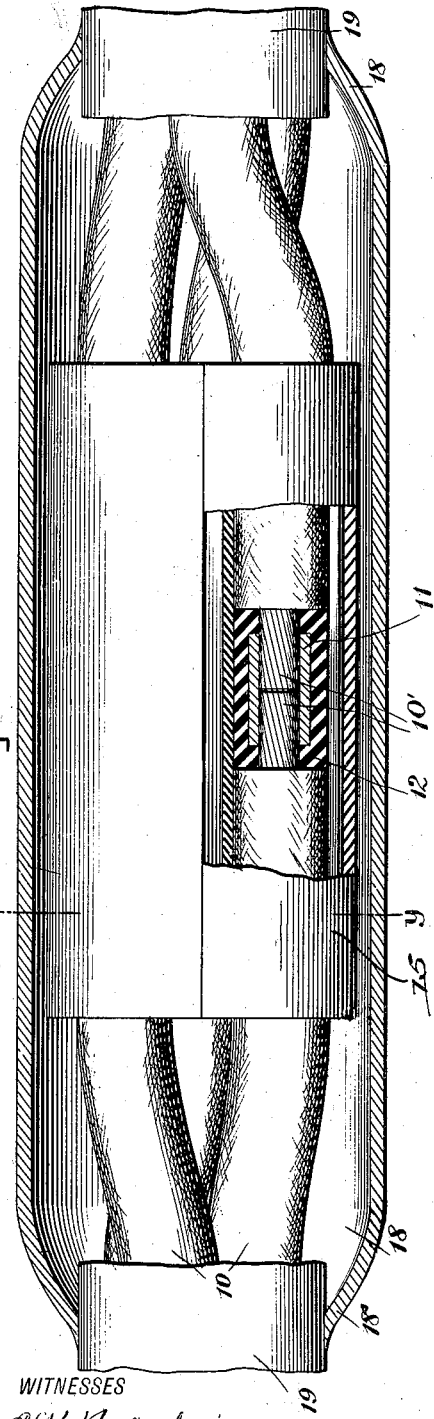
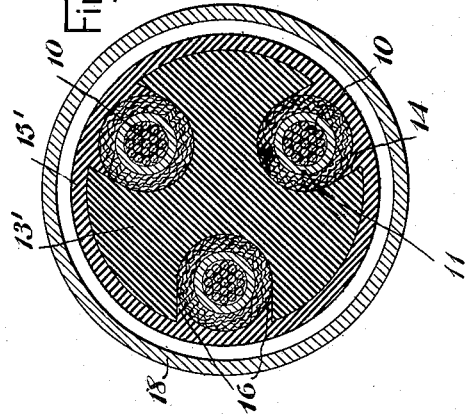
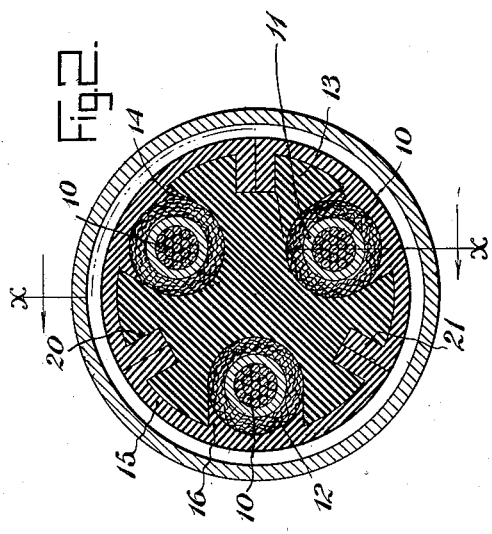
WITNESSES
INVENTOR
Fred Klenk
BY
ATTORNEYS

UNITED STATES PATENT OFFICE.

FRED KLENK, OF MOUNT VERNON, NEW YORK.

INSULATOR FOR HIGH-VOLTAGE ELECTRIC-CABLE SPLICES.

1,146,717.  Specification of Letters Patent.  Patented July 13, 1915.

Application filed February 6, 1914. Serial No. 816,926.

*To all whom it may concern:*

Be it known that I, FRED KLENK, a citizen of the United States, and a resident of Mount Vernon, in the county of Westchester and State of New York, have invented a new and Improved Insulator for High-Voltage Electric-Cable Splices, of which the following is a full, clear, and exact description.

This invention relates to electric conductors, and has particular reference to providing an insulated coupling or splicing means for high voltage electric cables which is of a more reliable and satisfactory nature than those heretofore usually relied upon.

Among the objects of the invention more definitely stated is to provide a coupling for multiple cable conductors in which there is provided a core which is inserted between the several strands or cables, said core being of a solid nature or one which provides the maximum surface space from one cable to the next.

A further object of the invention is to provide a covering including a sleeve made in one part or a plurality of parts longitudinally arranged and having interlocking connections with the several cables and parts of the core.

The foregoing and other objects of the invention will hereinafter be more fully described and claimed and illustrated in the drawings forming a part of this specification in which like characters of reference indicate corresponding parts in all the views, and in which—

Figure 1 is a longitudinal sectional view of a device made in accordance with this invention, certain parts being in elevation, the sectional part being on the line $x$—$x$ of Fig. 2; Fig. 2 is a vertical transverse section on the line $y$—$y$ of Fig. 1; and Fig. 3 is a transverse section of a slight modification.

The several parts of the device may be made of any suitable materials, and the relative sizes and proportions, as well as the general design of the mechanism, may be varied to a considerable extent without departing from the spirit of the invention hereinafter more fully set forth and specifically claimed.

Referring more particularly to the drawings for a better understanding of the invention, I show a plurality of cables or high voltage conductors 10 shown herein as three in number, but as to the number I do not wish to be limited as a greater or less number might be used. The adjacent ends of a cable to be spliced, indicated at 10', may be arranged end to end in any suitable manner and covered by means of a thimble 11. The cable so arranged is then coated by any suitable form or composition of composite matter 12 for the provision of insulation, protecting one cable from the next.

At 13 I show a core of any suitable composition or insulating material, said core having a solid center and of generally cylindrical configuration but provided with pockets or grooves 14 for the reception of the individual cables joined as above described; that is to say, each of the grooves 14 is adapted to receive snugly a single complete cable, the cable coming well within the outer boundary of the core. It will be noted, therefore, that the free gap from one cable to the next is of considerable distance following the outer surface of the core.

Surrounding the core and inclosing or embracing the cables associated therewith is a sleeve 15 adapted to be slipped longitudinally along and into interlocking engagement with the core, there being provided for the purpose of such interlock a plurality of tongues 16 each having a concave surface receiving the outer surface of one of the cables and projecting on opposite sides of the cable into the groove 14. The tongues, therefore, prevent any possibility of circumferential movement of the sleeve around the axis of the core. The sleeve may be incased in a sheath 18 having its ends wiped at 18' in connection with the usual lead covering 19 for the several cables.

In order to increase the free surface gap between one cable and the next at the core I provide a plurality of grooves 20 extending longitudinally of and parallel to the grooves 14, each groove 20 being preferably midway of each two adjacent grooves 14. For electricity, therefore, to pass from one cable to the next along the surface of the core, it will be required to travel a very long distance and following the walls of the grooves 14, the curved portions of the core and the three walls of the groove 20.

The sleeve 15 for convenience of assemblage may be formed in as many sections as there are provisions for cables; that is to say, there will be one section of the sleeve associated with each cable and having one pair of tongues 16 coöperating with such cable. The lateral parallel edges of the sleeve section, however, are formed into radial and inwardly projecting lips 21 of a thickness substantially equal to one half the width of the grooves 20, whereby the sleeve sections are prevented from either circumferential or radial displacements.

The modification shown in Fig. 3 is of the same general character as that above described, the core 13' being provided only with the radial grooves 14, and the sleeve 15' is shown as of one piece but having the same arrangement of interlocking tongues 16 as before stated.

Having thus described my invention, I claim as new and desire to secure by Letters Patent:—

1. In the herein described coupling device for high voltage multiple electric cables, the combination of a solid core of insulating material having a plurality of longitudinal grooves extending from one end to the other into which the several cables aforesaid are adapted to lie in spaced relation to one another, and a sleeve fitted to the exterior surface of the core and having as many pairs of tongues integral with the sleeve as there are grooves aforesaid in the core, each pair of tongues projecting into a core groove and embracing the outer surface of the cable therein.

2. The herein described coupling device for high voltage multiple electric cables, comprising a rigid core of insulating material having a plurality of grooves extending along the same from one end to the other and adapted to receive the several cables therein in spaced relation, said core also being provided with longitudinal grooves arranged along the surface thereof between the first mentioned grooves, and a multi-part sleeve fitted to the outside of the core, each part of the sleeve having means projecting into one of the first mentioned grooves to embrace the cable therein and also having a pair of marginal radially projecting flanges extending into the grooves of the latter mentioned group on each side of the cable groove, substantially as set forth.

In testimony whereof I have signed my name to this specification in the presence of two subscribing witnesses.

FRED KLENK.

Witnesses:
 EPHRAIM N. WESTERVELT,
 WILLIAM A. COX.